United States Patent
Song et al.

(10) Patent No.: US 12,538,107 B2
(45) Date of Patent: Jan. 27, 2026

(54) METHOD AND APPARATUS FOR ESTIMATING V2X COMMUNICATION CHANNEL

(71) Applicant: Korea National University of Transportation Industry-Academic Corporation Foundation, Chungju-si (KR)

(72) Inventors: Chang Ick Song, Chungju-si (KR); Ju Hyeok Kim, Chungju-si (KR)

(73) Assignee: Korea National University of Transportation Industry-Academic Corporation Foundation, Chungju-si (KR)

( * ) Notice: Subject to any disclaimer, the term of this patent is extended or adjusted under 35 U.S.C. 154(b) by 350 days.

(21) Appl. No.: 18/236,920

(22) Filed: Aug. 22, 2023

(65) Prior Publication Data
US 2024/0073658 A1   Feb. 29, 2024

(30) Foreign Application Priority Data
Aug. 23, 2022   (KR) .................. 10-2022-0105599

(51) Int. Cl.
 *H04W 4/40*   (2018.01)
 *H04L 5/00*   (2006.01)
 *H04W 72/0446*   (2023.01)

(52) U.S. Cl.
 CPC ............ *H04W 4/40* (2018.02); *H04L 5/0007* (2013.01); *H04L 5/0048* (2013.01); *H04W 72/0446* (2013.01)

(58) Field of Classification Search
 CPC .. H04W 4/40; H04W 72/0446; H04L 5/0007; H04L 5/0048
 See application file for complete search history.

(56) References Cited

U.S. PATENT DOCUMENTS

2020/0396575 A1* 12/2020 Kim ................. G06N 3/088

FOREIGN PATENT DOCUMENTS

| KR | 1020050014764 A | 2/2005 |
| KR | 1020090057862 A | 6/2009 |

(Continued)

OTHER PUBLICATIONS

Mohamed M.A. Moustafa, 'Trend Analysis Pilot Aided Channel Estimation in OFDM Systems', 2010 The 12th International Conference on Advanced Communication Technology (ICACT), IEEE, pp. 1-4. (Year: 2010).*

(Continued)

*Primary Examiner* — Melvin C Marcelo
(74) *Attorney, Agent, or Firm* — CM Law PLLC; Robert C. Klinger

(57) ABSTRACT

A method and a device for V2X communication channel estimation are disclosed. The V2X communication channel estimation according to an embodiment of the present disclosure may include calculating a first channel estimation value in a time-axis forward direction from a first midamble and a second channel estimation value in a time-axis backward direction from a second midamble located after the first midamble, based on a data pilot aided (DPA) channel estimation algorithm that uses a channel estimation value of a previous OFDM symbol to iteratively update a channel estimation value, and estimating, based on the first channel estimation value and the second channel estimation value, a final channel value of a specific OFDM symbol located between the first midamble and the second midamble.

20 Claims, 4 Drawing Sheets

(56) References Cited

FOREIGN PATENT DOCUMENTS

| KR | 20200077031 A | * | 6/2020 | .............. H04W 4/40 |
|---|---|---|---|---|
| KR | 1020200077031 A | | 6/2020 | |
| KR | 1020210081509 A | | 7/2021 | |
| KR | 1020220001433 A | | 1/2022 | |

OTHER PUBLICATIONS

"Written Decision on Registration", received in Korean Application No. 10-2022-0105599 for Applicant Korea National University of Transportation, dated Feb. 11, 2025.
Fernandez, Joseph A., et al., "Performance of the 802.11p Physical Layer in Vehicle-to-Vehicle Environments", IEEE Transactions on Vehicular Technology, vol. 61, No. 1, Jan. 2012.
Naik, Gaurang, et al., "IEEE 802.11bd & 5G NR V2X: Evolution of Radio Access Technologies for V2X Communications", IEEE Access, vol. 7, Jun. 10, 2019, pp. 70169-70184.
Request for the Submission of an Opinion received in Korean Application No. 10-2022-0105599, dated Jun. 25, 2024.

* cited by examiner

METHOD AND APPARATUS FOR ESTIMATING V2X COMMUNICATION CHANNEL

STATEMENT REGARDING GOVERNMENT SUPPORT

This invention was supported at least in part by Ministry of Science and ICT (MSIT) of South Korean government for research project. The title of one is "Development and implementation of URLLC intelligent V2X systems equipped with meta learning based fast"(Project Number: 1711167996) managed by National Research Foundation of Korea(NRF). The title of the other is "Development of Network Load Balancing Techniques Based on Multiple Communication/Computing/Storage Resources"(Project Number: 1711160483) managed by Institute of Information & communications Technology Planning & Evaluation (IITP).

CROSS-REFERENCE TO RELATED APPLICATION

This application is based on and claims priority under 35 U.S.C. 119 to Korean Patent Application No. 10-2022-0105599, filed on Aug. 23, 2022, in the Korean Intellectual Property Office, the disclosure of which is herein incorporated by reference in its entirety.

BACKGROUND OF THE INVENTION

Field of the Invention

The present disclosure relates to a V2X communication channel estimation method for performing vehicle-to-everything (V2X) channel estimation through bidirectional averaging by combining midamble and data pilot aided (DPA) techniques in a transmission and reception environment based on orthogonal frequency division multiplexing (OFDM).

Description of the Prior Art

As the autonomous vehicle industry has grown rapidly in recent years, governments and companies around the world have been investing huge amounts of labor and capital in autonomous vehicle research. V2X communication technology, which enables higher levels of autonomous driving by exchanging information with other vehicles and infrastructure, is also growing, and in-depth research is being actively conducted on V2X communication standardization such as IEEE802.11p/bd, LTE/5G-V2X, etc.

In general, in V2X communication, the amplitude and phase information of a physical layer channel impulse response changes rapidly in time and frequency due to the high-speed movement of a vehicle, so it is very difficult to fend. Inaccurately measured channel information reduces the reliability of received data and is thus considered to be one of the most urgent problems to be solved in V2X system implementation.

For channel information measurement at the reception end, IEEE802.11p defines four pilot signals per OFDM symbol in order to track frequency-axis channel changes, but does not specifically define a pilot for tracking time-axis channel changes.

To solve these problems, extensive research has been conducted on data pilot aided (DPA) channel estimation techniques wherein restored data symbols are reutilized as pilots to iteratively estimate a channel. In particular, spectral temporal averaging (STA), constructed data pilots (CDP), and time-domain reliability test and frequency-domain interpolation (TRFI) techniques have attracted the attention of many researchers due to high performance-to-complexity ratio.

Although the DPA techniques are effective in improving the accuracy of channel estimation without the need for additional pilot signals, the DPA techniques suffer from a performance degradation problem caused by the Doppler frequency shift increasing with the high-speed movement of a vehicle and the error propagation effect resulting from an increase in the length of a packet. Therefore, these DPA techniques face limitations in meeting the reliability requirements of next-generation autonomous driving systems that need to provide high-capacity data services in a fast-moving environment.

Therefore, to solve the above problem, 802.11bd, which is being addressed as the next generation V2X standard, considers a midamble technique in which a block-type pilot is added to a data field, similarly to a long training signal in a pre-amble, which is the beginning part of the packet.

However, in general, the accuracy of channel estimation increases proportionally to the number of pilots used, but the excessive use of pilots poses a problem of reducing frequency efficiency. Therefore, even in the case of the midamble techniques, it is necessary to study new channel estimation techniques that maximize performance with a small number of midambles.

The foregoing background information is technical information that the inventor had in the inventor's possession to derive the present disclosure or acquired in the process of deriving the present disclosure, and is not necessarily prior art that has been known to the general public before the filing of the present disclosure.

SUMMARY OF THE INVENTION

A task of an embodiment of the present disclosure is to perform V2X channel estimation through bidirectional averaging by combining midamble and DPA techniques in an OFDM-based transmission and reception environment to mitigate noise components, thereby maximizing performance gain.

A task of an embodiment of the present disclosure is to significantly improve the accuracy of channel estimation with a smaller number of midambles through averaging and midamble location optimization in a bidirectional averaging channel estimation technique in which a data pilot-based channel estimation method is combined with a midamble method.

A task of an embodiment of the present disclosure is to maximize channel estimation performance by applying a system (IEEE 802.11bd) having a midamble for improving the accuracy of channel estimation in a fast time-varying channel environment such as V2X and by inserting an optimal number of midambles at optimal locations depending on the situation.

The tasks of embodiments of the present disclosure are not limited to the above-described tasks, and other tasks and advantages of the present disclosure, which have not been described, may be understood from the following description and will be more clearly understood from the embodiments of the present disclosure. It will also be appreciated that the tasks and advantages of the present disclosure can be realized by the means and combinations thereof disclosed in the accompanying claims.

A V2X communication channel estimation method according to an embodiment of the present disclosure may include calculating a first channel estimation value in a time-axis forward direction from a first midamble and a second channel estimation value in a time-axis backward direction from a second midamble located after the first midamble, based on a data pilot aided (DPA) channel estimation algorithm that uses a channel estimation value of a previous OFDM symbol to iteratively update a channel estimation value, and estimating, based on the first channel estimation value and the second channel estimation value, a final channel value of a specific OFDM symbol located between the first midamble and the second midamble.

In addition, other methods, other systems, and computer-readable recording media in which computer programs for executing the methods are stored may be further provided to implement the present disclosure.

Aspects, features, and advantages other than those described above will become apparent from the following drawings, claims, and detailed description of the disclosure.

According to an embodiment of the present disclosure, in an OFDM-based transmission and reception environment, V2X channel estimation may be performed through bidirectional averaging by combining midamble and DPA techniques to mitigate noise components, thereby maximizing performance gain.

In addition, averaging and midamble location optimization may be performed through a bidirectional averaging channel estimation technique in which a data pilot-based channel estimation method is combined with a midamble method, thereby significantly improving the accuracy of channel estimation with a smaller number of midambles.

In addition, by applying a system (IEEE 802.11bd) having a midamble for improving the accuracy of channel estimation in a fast time-varying channel environment such as V2X and by inserting an optimal number of midambles at optimal locations depending on the situation, it is possible to solve the problem of frequency efficiency reduction due to the use of the midambles and to maximize channel estimation performance.

In addition, by combining the existing DPA technique and the midamble technique, the result of DPA channel estimation, performed in the forward direction from a front midamble (or a preamble), and the result of DPA channel estimation, performed in the backward direction from a rear midamble, may be averaged to mitigate the noise components, thereby achieving better performance with a smaller number of midambles than the existing channel estimation techniques.

The effects of the present disclosure are not limited to those described above, and other effects, which have not described, will be clearly understood by those skilled in the art from the following description.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
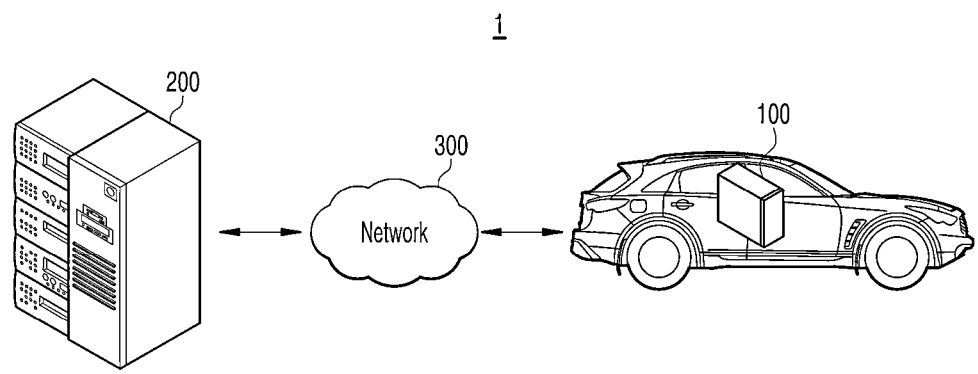
FIG. 1 schematically illustrates a V2X communication channel estimation system environment according to an embodiment.

The advantages and features of the present disclosure and ways to achieve them will be apparent by making reference to embodiments as described below in detail in conjunction with the accompanying drawings.

However, the present disclosure is not limited to the embodiments set forth below, but may be implemented in various different forms and shall be construed to include all modifications, equivalents, or alternatives falling within the technical idea and scope of the present disclosure. The embodiments given below are presented to complete the present disclosure and completely inform those skilled in the art of the scope of the present disclosure. In describing the present disclosure, when the detailed description of the relevant known technology is determined to unnecessarily obscure the gist of the present disclosure, the detailed description may be omitted.

The technical terms used in the present disclosure are only used to describe specific embodiments, and are not intended to limit the technical idea of the present disclosure. A singular expression includes a plural expression unless they are definitely different in the context. In the present disclosure, it should be understood that the terms "include" or "have" indicate existence of a feature, a number, a step, an operation, a structural element, parts, or a combination thereof, and do not preclude the existences or probability of addition of one or more another features, numeral, steps, operations, structural elements, parts, or combinations thereof. Such terms as "first" and "second" may be used to describe various elements, but the elements should not be limited to the terms. The above terms are used only for the purpose of distinguishing one element from another element.

Hereinafter, embodiments according to the present disclosure will be described in detail with reference to the accompanying drawings, and in describing them with reference to the accompanying drawings, the same or corresponding elements are given the same or similar reference numerals and duplicate descriptions thereof will be omitted.

FIG. 1 schematically illustrates a V2X communication channel estimation system environment according to an embodiment.

As shown in FIG. 1, a V2X communication channel estimation system 1 relates to a system for estimating a V2X communication channel by using bidirectional averaging, based on a midamble.

In V2X communication, the amplitude and phase information of a physical layer channel impulse response changes rapidly in time and frequency due to the high-speed movement of a vehicle, making it is very difficult to accurately estimate a channel at a reception end. To effectively solve this problem, in an embodiment, a midamble-based channel estimation method that periodically inserts a midamble into a packet may be applied.

However, the method of simply inserting a midamble has the problem of decreasing frequency efficiency ratio compared with performance gain as the number of midambles increases. Thus, in an embodiment, a new bidirectional averaging channel estimation technique that combines the existing data pilot-based channel estimation method with the existing midamble method may applied to solve this problem.

The bidirectional averaging channel estimation technique of an embodiment may significantly improve the accuracy of channel estimation with a smaller number of midambles through this averaging and midamble location optimization.

In an embodiment, the V2X communication channel estimation system 1 may be implemented by a V2X communication channel estimation device 100 and/or a server 200.

In other words, in an embodiment, the V2X communication channel estimation device 100 may be implemented on the server 200, and the server 200 may be a server for operating the V2X communication channel estimation system 1 including the V2X communication channel estimation device 100, or a server for implementing a part or all parts of the V2X communication channel estimation device 100.

Furthermore, the server 200 may be a database server that provides data to operate the V2X communication channel estimation device 100. In addition, the server 200 may include a web server, an application server, or a server for providing a deep learning network. The server 200 may include a big data server and an AI server necessary for applying various artificial intelligence algorithms, a computation server for performing computations for various algorithms, and the like.

In addition, in an embodiment, the server 200 may include or network with the above-described servers. That is, in the present embodiment, the server 200 may include or network with the above-described web server and AI server.

Further, in an embodiment, the V2X communication channel estimation device 100 may be an element that is disposed inside a vehicle as shown in FIG. 1, or may be a separate element that is disposed on the outside of the vehicle.

Although not illustrated, the V2X communication channel estimation device 100 may also be disposed in an infrastructure terminal, a pedestrian terminal, or the like.

In an embodiment, the terminal is a comprehensive concept that refers to a device including a wireless communication module for communicating with a base station in a wireless communication system. The terminal is related to a V2X communication system, and thus may be a vehicle, a device including a wireless communication module and disposed in a vehicle, etc.

In addition, the terminal may be interpreted as a concept that includes user equipment (UE) in WCDMA, LTE, HSPA, and IMT-2020 (5G or New Radio), as well as a mobile station (MS), a user terminal (UT), a subscriber station (SS), a wireless device, etc. in GSM. Also, depending on the type of use, the terminal may be a user's handheld device such as a smartphone.

In the V2X communication channel estimation system 1, the V2X communication channel estimation device 100 and the server 200 may be connected each other by a network 300. The network 300 may include wired networks such as local area networks (LANs), wide area networks (WANs), metropolitan area networks (MANs), and integrated service digital networks (ISDNs), or wireless networks such as wireless LANs, CDMA, Bluetooth, and satellite communications, but the scope of the present disclosure is not limited thereto. In addition, the network 300 may transmit and receive information by using short-range communication and/or long-range communication.

In addition, the network 300 may include connections of network elements such as a hub, a bridge, a router, a switch, and a gateway. The network 300 may include one or more connected networks, for example, a multi-network environment, including a public network such as the Internet and a private network such as a secure company private network. Access to the network 300 may be provided via one or more wired or wireless access networks. Furthermore, the network 300 may support an Internet of Things (IoT) network and/or 5G communication for exchanging and processing information between distributed elements, such as things.

Figure 2:
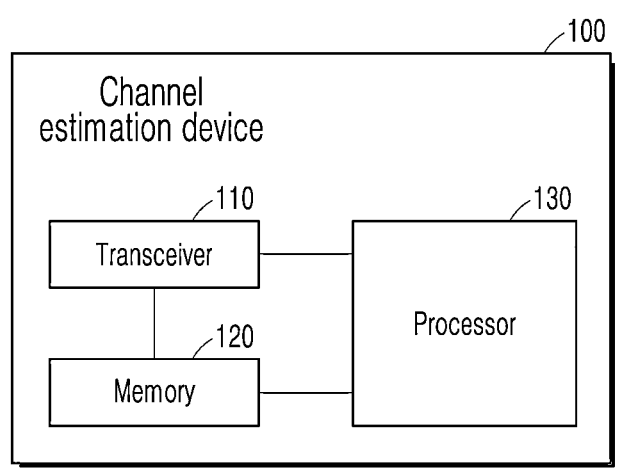
FIG. 2 is a block diagram schematically illustrating a V2X communication channel estimation device according to an embodiment.
Figure 3:
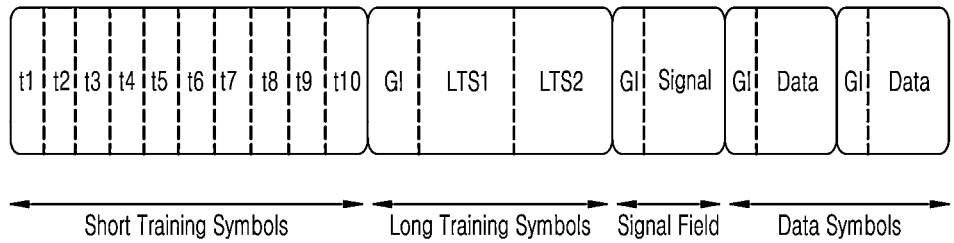
FIG. 3 illustrates a physical layer packet structure according to an embodiment.
Figure 4:
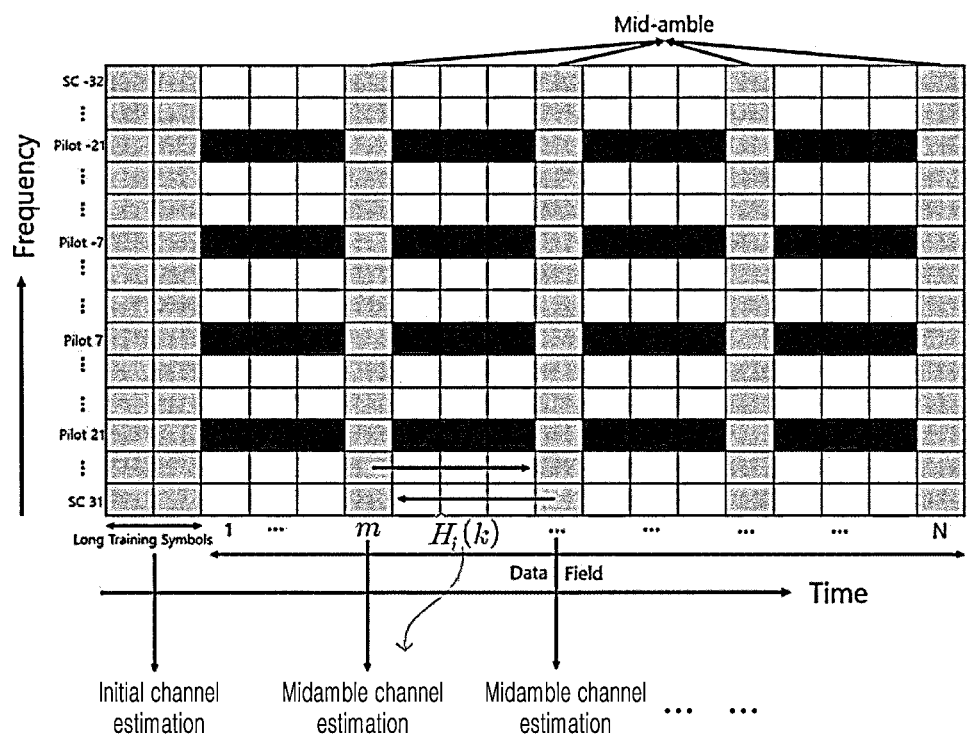
FIG. 4 illustrates a method for estimating a channel in a physical layer packet structure (M=4) into which a midamble is inserted according to an embodiment.

FIG. 2 is a block diagram schematically illustrating a V2X communication channel estimation device according to an embodiment. FIG. 3 illustrates a physical layer packet structure according to an embodiment. FIG. 4 illustrates a method for estimating a channel in a physical layer packet structure (M=4) into which a midamble is inserted according to an embodiment.

Referring to FIG. 2, the V2X communication channel estimation device 100 may include a transceiver 110, a memory 120, and a processor 130.

The transceiver 110 may transmit and receive a radio signal including a pilot symbol and a data symbol, and the signal may include a control signal, data, and the like. That is, the transceiver 110 may transmit and receive a signal in order to communicate with a server (vehicle-to-infrastructure (V2I)), with another vehicle (vehicle-to-vehicle (V2V)), or with a pedestrian (vehicle-to pedestrian(V2P)).

The transceiver 110 may transmit and receive control information via a control channel such as a physical downlink control channel (PDCCH), a physical uplink control channel (PUCCH), or the like, and may transmit and receive data via data channels such as a physical downlink shared channel (PDSCH), a physical uplink shared channel (PUSCH), or the like.

In an embodiment, for the sake of clarity, the following description focuses on the application of the IEEE802.11p/bd communication standard in a single antenna transmission and reception environment based on OFDM, but the technical features of the present disclosure are not limited thereto.

As shown in FIG. 3, one packet may include a short training field for performing synchronization, a long training field for performing initial channel estimation, a signal field including control information, and a data field for transmitting information.

The data field includes total of N OFDM symbols, and each OFDM symbol has a total of 64 subcarriers corresponding to index set $\mathbb{S}_T=\{-32, \ldots, 31\}$. Four subcarriers corresponding to index set $\mathbb{S}_P=\{-21, -7, 7, 21\}$ are allocated as pilot subcarriers for channel estimation and phase tracking, and subcarriers corresponding to index set $\mathbb{S}_V=\{-32, \ldots, -27, 0, 27, \ldots, 31\}$ are utilized as DC components and guard-bands and are thus not used. Therefore, message information may be transmitted through 48 subcarriers corresponding to the remaining index set $\mathbb{S}_D=\mathbb{S}_T\cap\mathbb{S}_P\cup\mathbb{S}_V)^e$.

Assuming that a guard interval is long enough and that inter-symbol interference and inter-subcarrier interference can be neglected, a signal received at a k-th subcarrier of an i-th OFDM symbol of the data field may be modelled as shown in Equation 1.

[Equation 1]

$$Y_i(k) = H_i(k)X_i(k) + W_i(k)$$

Here, $Y_i(k)$ is a reception signal on the k-th subcarrier of the i-th OFDM symbol, $H_i(k)$ is a channel frequency response (CFR) on the k-th subcarrier of the i-th OFDM symbol, $X_i(k)$ is a transmission signal on the k-th subcarrier of the i-th OFDM symbol, and $W_i(k)$ is Gaussian noise on the k-th subcarrier of the i-th OFDM symbol. An (i=0)th OFDM symbol corresponds to a long training field of a preamble.

The memory 120 may store various types of information necessary for controlling (computing) the operation of the V2X communication channel estimation device 100, and may store control software. The memory 120 may include a volatile or non-volatile recording medium.

The memory 120 may be connected to at least one 130 electrically or via an internal communication interface, and may store codes which, when executed by the processor 130, cause the processor 130 to control the V2X communication channel estimation device 100.

Here, the memory 120 may include a non-transitory storage medium, such as a magnetic storage medium or a flash storage medium, or a transitory storage medium such as RAM, but the scope of the present disclosure is not limited thereto. The memory 120 may include an internal memory and/or an external memory. The memory 120 may include volatile memory, such as DRAM, SRAM, or SDRAM, and nonvolatile memory, such as one-time programmable ROM (OTPROM), PROM, EPROM, EEPROM, mask ROM, flash ROM, NAND flash memory, or NOR flash memory. The memory 120 may include a storage device, for example, HDD or a flash drive, such as an SSD, a compact flash (CF) card, an SD card, a micro-SD card, a mini-SD card, an Xd card, or a memory stick.

As described above, the memory 120 may store information related to algorithms for performing learning according to the present disclosure. In addition, various other types of information necessary for achieving the aspects of the present disclosure may be stored in the memory 120, and the information stored in memory 120 may be updated as the information is received from a server or external device or is input by a user.

The processor 130 may control overall operations of the V2X communication channel estimation device 100. Specifically, the processor 130 may be connected to the elements of the V2X communication channel estimation device 100, including the memory 120, and may execute at least one command stored in memory 120 to control overall operations of the V2X communication channel estimation device 100.

The processor 130 may be implemented in a variety of ways. For example, the processor 130 may be implemented as at least one among an application specific integrated circuit (ASIC), an embedded processor, a microprocessor, a hardware control logic, a hardware finite state machine (FSM), and a digital signal processor (DSP).

The processor 130 is a type of central processing unit, and may drive control software stored in the memory 120 to control the operation of the V2X communication channel estimation device 100. The processor 130 may include any type of device capable of processing data Here, the "processor" may refer to a data processing device embedded in hardware and, for example, having a physically structured circuit in order to perform a function expressed by a code or an instruction contained in a program.

In an embodiment, channel information $H_i(K)$ rapidly changing in the time and frequency domain is accurately estimated at a reception end by using insufficient pilot and midamble resources, thereby increasing the reliability of received data. Unlike the conventional 11p standard, an embodiment uses a structure in which a total of M(<N) midambles are periodically inserted into the data field and transmitted. In this case, for the midambles, the sequence of long training signals may be used as is.

In an embodiment, a packet structure represented by a time-frequency grid, as shown in FIG. 4, may be applied. That is, in an embodiment, the processor 130 may estimate a channel from a packet with the structure shown in FIG. 4 by using a V2X channel estimation algorithm in which a DPA channel estimation technique is combined with a midamble.

The key idea of the V2X communication channel estimation device 100 in an embodiment is to perform DPA channel estimation in the forward and backward directions between two midambles and then average two different channel estimation values estimated at the same time-frequency to mitigate noise components, thereby maximizing performance.

Here, an (m=0)th midamble corresponds to a long training field of a preamble.

Therefore, in the V2X communication channel estimation device 100 of an embodiment, unlike conventional techniques, midambles may be located at last OFDM symbols of data fields to maximize the averaging gain. Subsequently, as the number of midambles increases, the midambles may be equally inserted into the data fields as shown in FIG. 4.

Hereinafter, a channel estimation process in the processor 130 will be described in detail.

First, the processor 130 may use two long training signals $Y_{LTS1}(k)$ and $Y_{LTS2}(k)$, received at a preamble end, to acquire an initial channel estimation value $\hat{H}_0(k)$ by using a least square (LS) method as shown in Equation 2 below.

Here, the two long training signals $Y_{LTS1}(k)$ and $Y_{LTS2}(k)$ received at the preamble end may be frequency domain symbols acquired by performing a 64-point fast Fourier transform (64-point FFT) on the long training symbols received with noise in the time domain, and $X_0(k)$ may be training signal at a k-th subcarrier promised in advance.

$$\hat{H}_0(k) = \frac{Y_{LTS1}(k) + Y_{LTS2}(k)}{2X_0(k)}, k \in \mathbb{S}_D \cup \mathbb{S}_P \quad \text{[Equation 2]}$$

The LS method, known as the basic channel estimation technique used in the prior art 802.11a, estimates a channel by using long training symbols and equalizes signals in all data fields, based on the estimated channel. The initial channel estimation value $\hat{H}_0(k)$ may be applied to equalize a data symbol before a first midamble received in a subsequent packet.

At the same time, in an i-th OFDM symbol having an m-th midamble inserted therein, a reception signal $Y_i^{(m)}(k)$ and a transmission signal $X_i^{(m)}(k)$ may be used to estimate a channel as shown in Equation 3 below.

$$\hat{H}_i^{(m)}(k) = \frac{Y_i^{(m)}(k)}{X_i^{(m)}(k)}, k \in \mathbb{S}_D \cup \mathbb{S}_P \quad \text{[Equation 3]}$$

Afterwards, DPA channel estimation may be performed in the time-axis forward direction from the m-th midamble to an (m+1)th midamble based on the channel estimated in the m-th midamble, and simultaneously in the time-axis backward direction from the (m+1)th midamble to the m-th midamble based on a channel estimated in the (m+1)th midamble, and then the two results may be averaged, thereby finally completing the channel estimation.

For the DPA channel estimation in the forward direction, the processor 130 may first equalize a current reception signal by using a channel value estimated from a previous OFDM symbol, as shown in Equation 4 below.

$$\hat{T}_i(k) = \frac{Y_i(k)}{\hat{H}_{i-1}^{forward}(k)} \quad [\text{Equation 4}]$$

The processor 130 then may estimate a transmission signal $\hat{X}_i(k)=Q(\hat{T}_i(k))$ through a symbol demapping process $Q(\bullet)$ with respect to $\hat{T}_i(k)$, and may estimate a channel by equalizing a reception signal $Y_i(k)$ using the estimated transmission symbol as a pilot. The channel estimated in this way may be represented mathematically by Equation 5 below.

Here, $Q(\bullet)$ indicates a quantization operation that demaps an equalized signal to an original constellation thereof.

$$\tilde{H}_i(k) = \frac{Y_i(k)}{Q\left(\frac{Y_i(k)}{\hat{H}_{i-1}^{forward}(k)}\right)}, \text{ for } k \in \mathbb{S}_D \quad [\text{Equation 5}]$$

Subsequently, the processor 130 may apply existing error correction techniques such as STA, CDP, and TRFI to Equation 5 to finally calculate a forward channel estimation value $\hat{H}_i^{forward}(k)$.

The STA technique is intended to solve the problem of LS-based channel estimation which may be a good technique for achieving better performance with low calculation complexity in a non-time-varying channel, but in a high-speed movement situation such as a vehicular environment, cannot reflect channel variations, resulting in a serious error towards the end of a packet. The STA technique is a data-aided channel estimation technique that continuously updates a channel estimation value by using an estimation value of a data symbol in a specific order.

This iterative update of a channel estimation value and a data restoration value may reduce channel estimation errors even in a time-varying channel environment. However, in the process of estimating a modulation symbol, there still remains a channel estimation error, and a demapping error occurs due to noise, and reflects the channel estimation error. Therefore, to mitigate the channel estimation error caused by the demapping error, the smoothing process for taking the average of sequentially estimated channel values in the frequency domain and the time domain.

The STA technique shows relatively good performance at low signal-to-noise ratio (SNR), in which noise is relatively large, due to the smoothing process of taking the average in the time and frequency domains. However, the STA technique has a disadvantage that when the SNR increases, the error floor phenomenon occurs in which errors does not decrease even when the SNR increases due to inter-symbol interference caused by the channel estimation error.

In addition, the CDP technique is a technique that estimates a channel by minimizing a demapping error through channel reliability testing by using the high channel correlation between two adjacent OFDM symbols in the time domain.

If two restored data values after demapping are equal to each other, it is determined that a channel estimation value is reliable, and otherwise, it is determined that a current channel estimation value is discarded and a previous channel estimation value is used as a current channel estimation value.

The CDP technique achieves good performance in a high SNR region compared with the STA technique, while in a low SNR region, the STA technique still exhibits better performance. Also, the CDP technique has the disadvantage that even if it is determined that there is no reliability in the time axis is deemed unreliable, the previous channel estimation value is still used, and thus it is difficult to reflect time varying channel changes.

The TRFI technique is also a proposed method to compensate for the problem caused by the CDP technique of using a channel value of a previous symbol as a current channel estimation value when a demapping error occurs. Unlike CDP, TRFI pauses channel estimation when it is determined that a channel estimated from a specific subcarrier of a specific symbol is unreliable after reliability testing, and then performs interpolation along the frequency axis by using channel values estimated from four pilot subcarriers and channel values of subcarriers determined to be reliable.

The TRFI technique is advantageous in that the time and frequency correlation characteristics are used to reduce the demapping error of a channel estimation value, resulting in improved channel estimation accuracy and higher frequency correlation characteristics in a region with high SNR compared with the STA technique. In particular, it may be seen that when compared with the CDP technique, the TRFI technique can achieve better performance at a modulation level (or rate) equal to or higher than 64 QAM. However, like the CDP technique, the TRFI technique may suffer from performance degradation in a region of a low SNR due to a larger noise-induced demapping error.

In contrast to the above description, for backward DPA channel estimation, the processor 130 may iteratively estimate a channel of the previous OFDM symbol from the channel information of the next OFDM symbol, as shown in Equation 6 below.

$$\tilde{H}_i(k) = \frac{Y_i(k)}{Q\left(\frac{Y_i(k)}{\hat{H}_{i+1}^{backward}(k)}\right)}, \text{ for } k \in \mathbb{S}_D \quad [\text{Equation 6}]$$

The processor 130 may calculate $\hat{H}_i^{backward}(k)$ by applying, to Equation 6, the same error correction technique as in the forward DPA channel estimation.

The processor 130 may finally average two results in the forward direction and the backward direction to estimate channel values of an i-th subcarrier and a k-th subcarrier, as shown in Equation 7 below.

$$\hat{H}_i(k) = \frac{\hat{H}_i^{forward}(k) + \hat{H}_i^{backward}(k)}{2} \quad [\text{Equation 7}]$$

Figure 5:
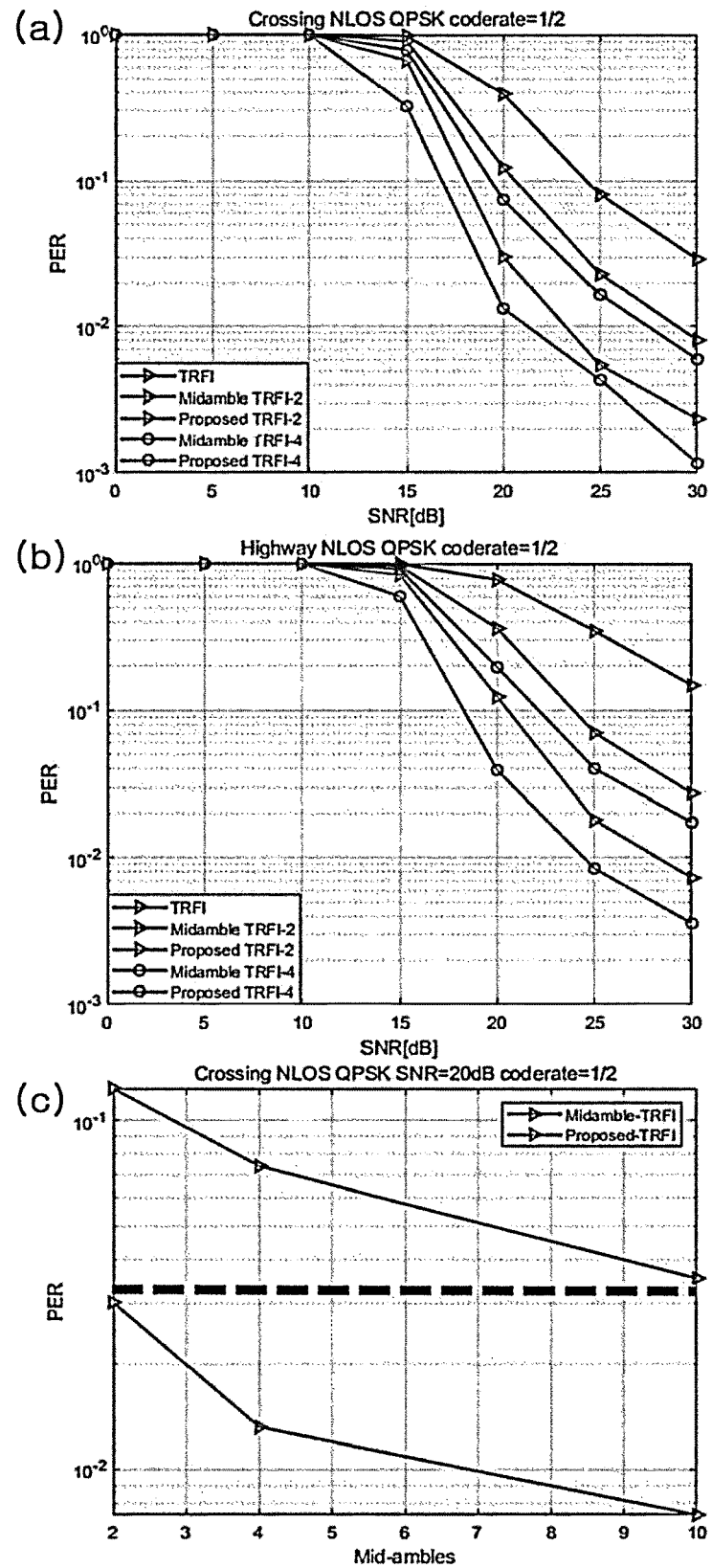
FIG. 5 illustrates performance based on the number of midambles according to an embodiment.

FIG. 5 illustrates performance based on the number of midambles according to an embodiment.

FIG. 5 illustrates simulation results for identifying performance based on the number of midambles. In V2X communication channel estimation device 100 in an embodiment, two DPA processes and an averaging operation are required for the same symbol compared to the prior art, and thus the reception complexity may increase.

However, referring to FIG. 5, it may be seen that the V2X communication channel estimation device 100 in an embodiment is superior to the prior art in terms of minimizing the number of midambles required for the same performance indicator.

In an embodiment, crossing non-line-of-sight (NLoS) and highway NLoS models among Cohda Wireless channel models may be assumed for simulation. These two channel environments have doubly selective channel characteristics by which a channel changes rapidly in both time and frequency axes, and thus are more challenging than an LoS environment.

TABLE 1

| Parameters | Value |
| --- | --- |
| Bandwidth | 10 MHz |
| Subcarrier Spacing | 156.25 KHz |
| Modulation | QPSK |
| Code rate | 1/2 |
| Guard interval | 1.6 μs |
| Symbol length | 6.4 μs |
| # OFDM symbols in data field (N) | 100, 102, 104 |
| # mid-ambles (M) | 0, 2, 4 |
| Mid-amble location | { }, {51, 102}, {26, 52, 78, 104} |
| DPA scheme | TRFI |

Table 1 shows system parameters used for simulation in an embodiment. The parameters other than midambles are based on the existing 11p standard. For DPA channel error correction, an embodiment has employed the TRFI technique, which exhibits the best performance a high SNR, but other error correction techniques such as STA and CDP may be easily applied.

FIGS. 5A and 5B show performance results of applying the conventional midamble channel estimation technique and the embodiment technique in an embodiment in a crossing environment and a highway NLOS environment, respectively. It may be seen that in both different environments, the midamble technique in an embodiment may achieve better performance with a smaller number of midambles than the prior art. Although not shown in the drawings, in a LoS environments, there is less channel variation in the frequency axis than in an NLoS environment, so the STA technique that performs averaging along the frequency axis may exhibit better performance than the TRFI technique.

FIG. 5C illustrates PER performance based on the number of midambles in a crossing environment. It may be seen from FIG. 5C that the technique of the exemplary V2X communication channel estimation device 100 in an embodiment significantly reduces the number of midambles required for the same PER performance indicator. Therefore, implementing a V2X system using the midamble of the V2X communication channel estimation device 100 in an embodiment may help to solve the frequency efficiency reduction problem.

Figure 6:
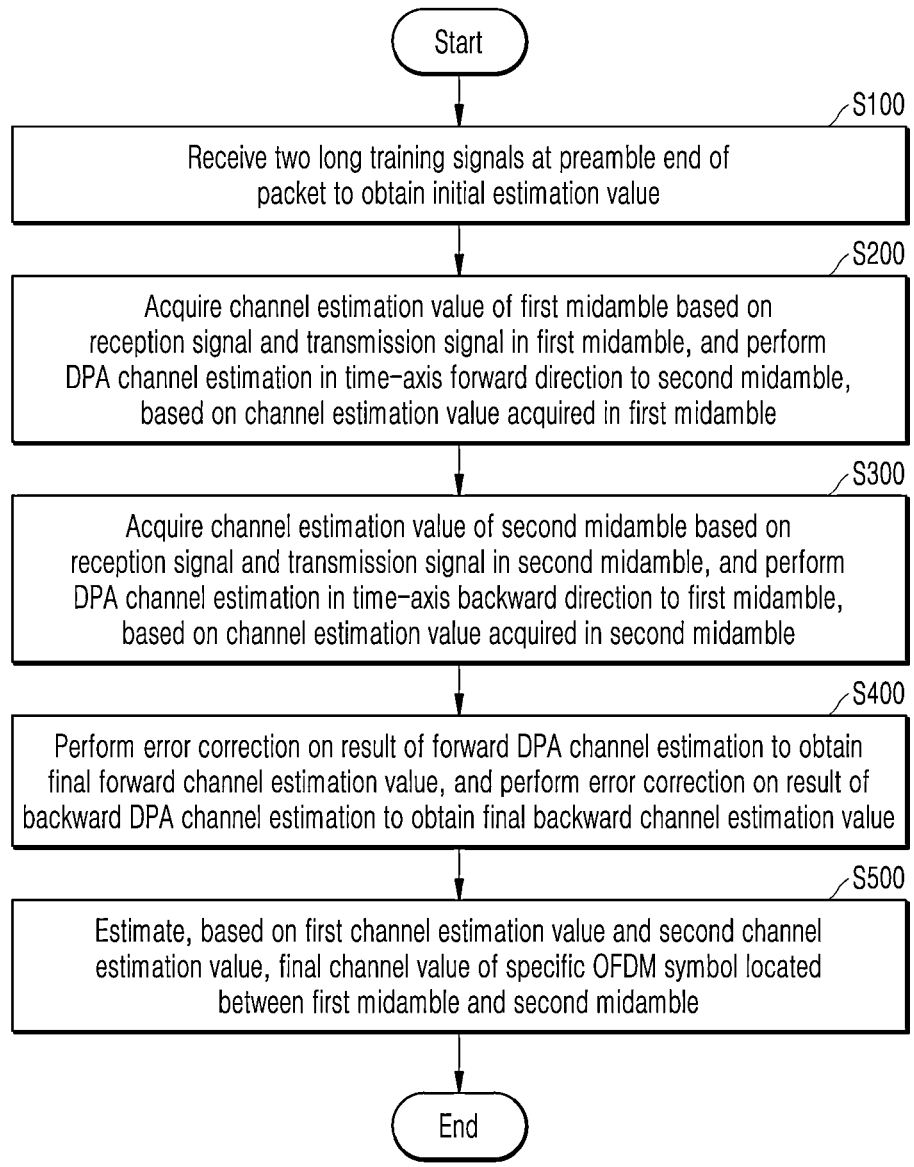
FIG. 6 is a flowchart illustrating a V2X communication channel estimation method according to an embodiment.

FIG. 6 is a flowchart illustrating a V2X communication channel estimation method according to an embodiment. Hereinafter, the process in which the processor 130 estimates a V2X communication channel will be described with reference to FIG. 6.

In operation S100, the processor 130 receives two long training signals in a preamble end of a packet to calculate an initial channel estimation value.

An embodiment relates to a V2X communication channel estimation method for estimating a channel in a packet having midambles, which are pilot blocks and are added to a data field, in a transmission and reception environment based on OFDM, wherein at least a part of each operation is performed by a processor.

In other words, in an embodiment, after initial channel estimation with a training signal in a preamble end of a packet, in order to perform accurate channel estimation in a situation where the amplitude and phase information of a physical layer channel impulse response changes rapidly in time and frequency due to the high-speed movement of a vehicle with accordance with V2X communication characteristics, an updated channel estimation may be performed with a midamble added to the packet to equalize a specific OFDM symbol.

First, the processor 130 may calculate an initial channel estimation value, and in an embodiment, may calculate the initial channel estimation value based on a data pilot aided (DPA) channel estimation algorithm that uses a channel estimation value of a previous OFDM symbol to iteratively update a channel estimation value.

The processor 130 may receive two frequency domain training signals $Y_{LTS1}(k)$ and $Y_{LTS2}(k)$ at a k-th subcarrier in a preamble end of a packet, and may estimate an initial channel $\hat{H}_0(k)$ based on Equation 2 by using the two frequency domain training signals $Y_{LTS1}(k)$ and $Y_{LTS2}(k)$ at the k-th subcarrier and a predefined transmission signal $X_0(k)$ at the k-th subcarrier in the preamble end of the packet.

Subsequently, in operation S200, the processor 130 acquires a channel estimation value of a first midamble based on a reception signal and a transmission signal in the first midamble, and performs DPA channel estimation in a time-axis forward direction to a second midamble, based on the channel estimation value acquired in the first midamble.

In this case, the midambles may be located at last OFDM symbols of N data fields (wherein N is an arbitrary natural number), and when the number of midambles is equal to or greater than 2, a total of M midambles (wherein M is an arbitrary natural number<N) may be inserted equally into the N data fields.

First, in order to estimate a channel based on the reception signal and the transmission signal in the first midamble, the processor 130 may estimate a channel $\hat{H}_i^{(m)}(k)$ in an m-th first midamble (m is an arbitrary natural number, m∈M) based on Equation 3 by using a reception signal $Y_i^{(m)}(k)$ and a transmission signal $X_i^{(m)}(k)$ at an i-th OFDM symbol into which the m-th first midamble is inserted.

The processor 130 may perform DPA channel estimation in the time-axis forward direction, wherein a channel $\tilde{H}_i(k)$ at the i-th OFDM symbol may be estimated in the forward direction, based on Equation 5, by using a channel value $\hat{H}_{i-1}^{forward}(k)$ estimated at a previous OFDM symbol, and a reception signal $Y_i(k)$ and a transmission signal $\hat{X}_i(k)$ at the i-th OFDM symbol. At this time, when the previous OFDM symbol is the first midamble, the channel value $\hat{H}_{i-1}^{forward}(k)$ estimated at the previous OFDM symbol may be the channel value $\hat{H}_i^{(m)}(k)$ in the first midamble.

More specifically, in order to estimate the channel $\tilde{H}_i(k)$ at the i-th OFDM symbol in the forward direction, the processor 130 may equalize the reception signal $Y_i(k)$ at the i-th OFDM symbol by using the channel value $\hat{H}_{i-1}^{forward}(k)$ estimated at the previous OFDM symbol, and may estimate, based on the equalization result $\hat{T}_i(k)=Y_i(k)/\hat{H}_{i-1}^{forward}(k)$, the transmission signal $\hat{X}_i(k)=Q(\hat{T}_i(k))$ at the i-th OFDM symbol through a symbol demapping process.

The processor 130 may estimate the channel $\tilde{H}_i(k)$ at the i-th OFDM symbol by equalizing the reception signal $Y_i(k)$ with the estimated transmission signal $\hat{X}_i(k)$, and may repeat the process in the time-axis forward direction from the m-th first midamble to an OFDM symbol before an (m+1)th second midamble.

In operation S300, the processor 130 acquires a channel estimation value of the second midamble based on a reception signal and a transmission signal in the second midamble, and performs DPA channel estimation in the time-axis backward direction to the first midamble, based on the channel estimation value acquired in the second midamble.

First, in order to estimate a channel based on a reception signal and a transmission signal in the second midamble, the processor 130 may estimate a channel $\hat{H}_i^{(m)}(k)$ in the (m+1)th second midamble, based on Equation before, by using a reception signal $Y_i^{(m)}(k)$ and a transmission signal $X_i^{(m)}(k)$ at an i-th OFDM symbol into which the (m+1)th second midamble is inserted.

$$\hat{H}_i^{(m+1)}(k) = \frac{Y_i^{(m+1)}(k)}{X_i^{(m+1)}(k)}, k \in \mathbb{S}_D \cup \mathbb{S}_P \quad \text{[Equation]}$$

The processor 130 may perform DPA channel estimation in the time-axis backward direction, wherein the channel $\tilde{H}_i(k)$ at the i-th OFDM symbol may be estimated in the backward direction, based on Equation 6, by using a channel value $\hat{H}_{i+1}^{backward}(k)$ estimated at the next OFDM symbol, a reception signal $Y_i(k)$ at the i-th OFDM symbol, and a transmission signal $\hat{X}_i(k)$. At this time, when the next OFDM symbol is the second midamble, the channel value $\tilde{H}_{i+1}^{backward}(k)$ estimated at the next OFDM symbol may be a channel value $\tilde{H}_i^{(m+1)}(k)$ in the second midamble.

More specifically, in order to estimate the channel $\tilde{H}_i(k)$ at the i-th OFDM symbol in the backward direction, the processor 130 may equalize the reception signal $Y_i(k)$ at the i-th OFDM symbol by using the channel value $\tilde{H}_{i+1}^{backward}(k)$ estimated at the next OFDM symbol, and may estimate, based on the equalization result $\hat{T}_i(k)=Y_i(k)/\hat{H}_{i+1}^{backward}(k)$, the transmission signal $\hat{X}_i(k)=Q(\hat{T}_i(k))$ at the i-th OFDM symbol through a symbol demapping process.

The processor 130 may estimate the channel $\tilde{H}_i(k)$ at the i-th OFDM symbol by equalizing the reception signal $Y_i(k)$ through the estimated transmission signal $\hat{X}_i(k)$, and may repeat the process in the time-axis backward direction from the (m+1)th second midamble to an OFDM symbol before the m-th first midamble.

In an embodiment, the flowchart shows operations S100 to S300 being performed in sequence, but the present disclosure is not limited thereto and operations S100 to S300 may be performed simultaneously.

In operation S400, the processor 130 may perform error correction on the result of the forward DPA channel estimation to calculate a final forward channel estimation value $\hat{H}_i^{forward}(k)$, and may perform error correction on the result of the backward DPA channel estimation to calculate a final backward channel estimation value $\hat{H}_i^{backward}(k)$.

Finally, in operation S500, the processor 130 estimates, based on a first channel estimation value and a second channel estimation value, a final channel value of a specific OFDM symbol located between the first midamble and the second midamble.

In order to estimate the final channel value of the specific OFDM symbol, the processor 130 may estimate a channel value $\hat{H}_i(k)$ of a k-th subcarrier of the i-th OFDM symbol by averaging the final forward channel estimation value $\hat{H}_i^{forward}(k)$ and the final backward channel estimation value $\hat{H}_i^{backward}(k)$, as shown in Equation 7.

The embodiments of the present disclosure as described above may be implemented in the form of a computer program executable through various components on a computer, and such a computer program may be recorded in a computer-readable medium. This medium may include a magnetic medium such as a hard disk, a floppy disk, and a magnetic tape, an optical recording medium such as a CD-ROM, a DVD, a magneto-optical medium such as a floptical disk, and a hardware device specially configured to store and execute program instructions, such as a ROM, a RAM, and a flash memory.

The computer program may be specifically designed for the present disclosure, and may be known to and used by those skilled in computer software fields. Examples of the computer program may include machine language code generated by a compiler and high-level language code executable by a computer through an interpreter or the like.

In the specification (particularly, in the claims) of the present disclosure, the term "the" and the indication term similar thereto may correspond to both the singular and the plural. When the present disclosure includes a range, the present disclosure includes an disclosure to which an individual value belonging to the range is applied (unless there is description against it), which means that the detailed description of the present disclosure includes the individual value within the range.

Unless there is clear description of the order of steps included in the method according to the present disclosure or unless indicated otherwise, the steps can be conducted in appropriate order. The present disclosure is not necessarily limited to the order of the steps described therein. All examples or example terms (for example, "etc.") may be simply used to describe the present disclosure in detail but do not limit the scope of the present disclosure unless the scope of the present disclosure is limited by the claims. Further, those skilled in the art can identify that various modifications, combinations, and changes can be configured according to design conditions and factors within the range of appended claims and equivalents thereof.

Accordingly, the spirit and scope of the present disclosure should not be limited or determined by the above-described embodiments, and it should be noted that not only the claims which will be described below but also their equivalents fall within the spirit and scope of the present disclosure.

What is claimed is:

1. A V2X communication channel estimation method for estimating a channel in a packet having midambles, which are pilot blocks and are added to a data field, in a transmission and reception environment based on orthogonal frequency division multiplexing (OFDM), the method comprising operations, each of which is at least partially performed by a processor, of:

calculating a first channel estimation value in a time-axis forward direction from a first midamble and a second channel estimation value in a time-axis backward direction from a second midamble located after the first midamble, based on a data pilot aided (DPA) channel estimation algorithm that uses a channel estimation value of a previous OFDM symbol to iteratively update a channel estimation value; and estimating, based on the first channel estimation value and the second channel estimation value, a final channel value of a specific OFDM symbol located between the first midamble and the second midamble.

2. The V2X communication channel estimation method of claim 1, wherein the midambles are located at last OFDM symbols of N data fields (N is an arbitrary natural number), and wherein when the number of midambles is equal to or greater than 2, a total of M midambles (M is an arbitrary natural number<N) are inserted equally into the N data fields.

3. The V2X communication channel estimation method of claim 2, wherein the calculating comprises:

receiving two long training signals in a preamble end of the packet to calculate an initial channel estimation value;

acquiring a channel estimation value of the first midamble based on a reception signal and a transmission signal in the first midamble, and performing DPA channel estimation in the time-axis forward direction to the second midamble, based on the channel estimation value acquired in the first midamble; and acquiring a channel estimation value of the second midamble based on a reception signal and a transmission signal in the second midamble, and performing DPA channel estimation in the time-axis backward direction to the first midamble, based on the channel estimation value acquired in the second midamble.

4. The V2X communication channel estimation method of claim 3, wherein the calculating further comprises:

performing error correction on a result of the forward DPA channel estimation to calculate a final forward channel estimation value $\hat{H}_i^{forward}(k)$; and performing error correction on a result of the backward DPA channel estimation to calculate a final backward channel estimation value $\hat{H}_i^{backward}(k)$.

5. The V2X communication channel estimation method of claim 4, wherein the calculating of the initial channel estimation value comprises:

receiving two frequency domain training signals $Y_{LTS1}(k)$ and $Y_{LTS2}(k)$ at a k-th subcarrier in the preamble end of the packet; and estimating an initial channel $\hat{H}_0(k)$ based on Equation 1 below by using the two frequency domain training signals $Y_{LTS1}(k)$ and $Y_{LTS2}(k)$ at the k-th subcarrier and a predefined transmission signal $X_0(k)$ at the k-th subcarrier in the preamble end of the packet, $$\hat{H}_0(k) = \frac{Y_{LTS1}(k) + Y_{LTS2}(k)}{2X_0(k)}, k \in \mathbb{S}_D \cup \mathbb{S}_P, \quad \text{[Equation 1]}$$

wherein k is an arbitrary integer subcarrier index, $\mathbb{S}_D$ is a data subcarrier index set, and $\mathbb{S}_P$ is a pilot subcarrier index set.

6. The V2X communication channel estimation method of claim 5, wherein the estimating of the channel based on the reception signal and the transmission signal in the first midamble comprises estimating a channel $\hat{H}_i^{(m)}(k)$ in an m-th first midamble (m is an arbitrary natural number, m∈M) based on Equation 2 below by using a reception signal $Y_i^{(m)}(k)$ and a transmission signal $X_i^{(m)}(k)$ at an i-th OFDM symbol into which the m-th first midamble is inserted, $$\hat{H}_i^{(m)}(k) = \frac{Y_i^{(m)}(k)}{X_i^{(m)}(k)}, k \in \mathbb{S}_D \cup \mathbb{S}_P, \quad \text{[Equation 2]}$$

wherein i is an arbitrary natural number and is an OFDM symbol index constituting the data field.

7. The V2X communication channel estimation method of claim 6, wherein the performing of DPA channel estimation in the time-axis forward direction comprises estimating a channel $\tilde{H}_i(k)$ at the i-th OFDM symbol in the forward direction, based on Equation 3 below, by using a channel value $\tilde{H}_{i-1}^{forward}(k)$ estimated at a previous OFDM symbol, and a reception signal $Y_i(k)$ and a transmission signal $\hat{X}_i(k)$ at the i-th OFDM symbol, wherein when the previous OFDM symbol is the first midamble, the channel value $\hat{H}_{i-1}^{forward}(k)$ estimated at the previous OFDM symbol is the channel value $\tilde{H}_i^{(m)}(k)$ in the first midamble, $$\tilde{H}_i(k) = \frac{Y_i(k)}{Q\left(\frac{Y_i(k)}{\hat{H}_{i-1}^{forward}(k)}\right)}, \text{ for } k \in \mathbb{S}_D \quad \text{[Equation 3]}$$

and wherein the estimating of the channel $\tilde{H}_i(k)$ at the i-th OFDM symbol in the forward direction comprises:

equalizing the reception signal $Y_i(k)$ at the i-th OFDM symbol by using the channel value $\hat{H}_{i-1}^{forward}(k)$ estimated at the previous OFDM symbol;

estimating, based on the equalization result $\hat{T}_i(k)=Y_i(k)/\hat{H}_{i-1}^{forward}(k)$, the transmission signal $\hat{X}_i(k)=Q(\hat{T}_i(k))$ at the i-th OFDM symbol through a symbol demapping process;

estimating the channel $\tilde{H}_i(k)$ at the i-th OFDM symbol by equalizing the reception signal $Y_i(k)$ through the estimated transmission signal $\hat{X}_i(k)$; and repeating the process in the time-axis forward direction from the m-th first midamble to an OFDM symbol before an (m+1)th second midamble.

8. The V2X communication channel estimation method of claim 5, wherein the estimating of the channel based on the reception signal and the transmission signal in the second midamble comprises estimating a channel $\hat{H}_i^{(m)}(k)$ in the (m+1)th second midamble, based on Equation 4 below, by using a reception signal $Y_i^{(m)}(k)$ and a transmission signal $X_i^{(m)}(k)$ at an i-th OFDM symbol into which the (m+1)th second midamble is inserted, $$\hat{H}_i^{(m+1)}(k) = \frac{Y_i^{(m+1)}(k)}{X_i^{(m+1)}(k)}, k \in \mathbb{S}_D \cup \mathbb{S}_P. \quad \text{[Equation 4]}$$

9. The V2X communication channel estimation method of claim 8, wherein the performing of DPA channel estimation in the time-axis backward direction comprises estimating a channel $\tilde{H}_i(k)$ at the i-th OFDM symbol in the backward direction, based on Equation 5 below, by using a channel value $\hat{H}_{i+1}^{backward}(k)$ estimated at a next OFDM symbol, and a reception signal $Y_i(k)$ and a transmission signal $\hat{X}_i(k)$ at the i-th OFDM symbol, $$\tilde{H}_i(k) = \frac{Y_i(k)}{Q\left(\frac{Y_i(k)}{\hat{H}_{i+1}^{backward}(k)}\right)}, \text{ for } k \in \mathbb{S}_D, \quad \text{[Equation 5]}$$

wherein when the next OFDM symbol is the second midamble, the channel value $\hat{H}_{i+1}^{backward}(k)$ estimated at the next OFDM symbol is a channel value $\tilde{H}_i^{(m+1)}(k)$ in the second midamble, and wherein the estimating of the channel $\tilde{H}_i(k)$ at the i-th OFDM symbol in the backward direction comprises:

equalizing the reception signal $Y_i(k)$ at the i-th OFDM symbol by using the channel value $\hat{H}_{i+1}^{backward}(k)$ estimated at the next OFDM symbol;

estimating, based on the equalization result $\hat{T}_i(k)=Y_i(k)/\hat{H}_{i+1}^{backward}(k)$, the transmission signal $\hat{X}_i(k)=Q(\hat{T}_i(k))$ at the i-th OFDM symbol through a symbol demapping process;

estimating the channel $\tilde{H}_i(k)$ at the i-th OFDM symbol by equalizing the reception signal $Y_i(k)$ through the estimated transmission signal $\hat{X}_i(k)$; and repeating the process in the time-axis backward direction from the (m+1)th second midamble to an OFDM symbol before the m-th first midamble.

10. The V2X communication channel estimation method of claim 4, wherein the estimating of the final channel value of the specific OFDM symbol comprises estimating a channel value $\hat{H}_i(k)$ of a k-th subcarrier of the i-th OFDM symbol by averaging the final forward channel estimation value $\hat{H}_i^{forward}(k)$ and the final backward channel estimation value $\hat{H}_i^{backward}(k)$.

11. A V2X communication channel estimation device for estimating a channel in a packet having midambles, which are pilot blocks and are added to a data field, in a transmission and reception environment based on orthogonal frequency division multiplexing (OFDM), the V2X communication channel estimation device comprising:

a memory; and at least one processor connected to the memory and configured to execute computer-readable commands included in the memory, wherein the at least one processor is configured to:

calculate a first channel estimation value in a time-axis forward direction from a first midamble and a second channel estimation value in a time-axis backward direction from a second midamble located after the first midamble, based on a data pilot aided (DPA) channel estimation algorithm that uses a channel estimation value of a previous OFDM symbol to iteratively update a channel estimation value; and estimate, based on the first channel estimation value and the second channel estimation value, a final channel value of a specific OFDM symbol located between the first midamble and the second midamble.

12. The V2X communication channel estimation device of claim 11, wherein the midambles are located at last OFDM symbols of N data fields (N is an arbitrary natural number), and wherein when the number of midambles is equal to or greater than 2, a total of M midambles (M is an arbitrary natural number<N) are inserted equally into the N data fields.

13. The V2X communication channel estimation device of claim 12, wherein the calculating comprises:

receiving two long training signals in a preamble end of the packet to calculate an initial channel estimation value;

acquiring a channel estimation value of the first midamble based on a reception signal and a transmission signal in the first midamble, and performing DPA channel estimation in the time-axis forward direction to the second midamble, based on the channel estimation value acquired in the first midamble; and acquiring a channel estimation value of the second midamble based on a reception signal and a transmission signal in the second midamble, and performing DPA channel estimation in the time-axis backward direction to the first midamble, based on the channel estimation value acquired in the second midamble.

14. The V2X communication channel estimation device of claim 13, wherein the calculating further comprises:

performing error correction on a result of the forward DPA channel estimation to calculate a final forward channel estimation value $\hat{H}_i^{forward}(k)$; and performing error correction on a result of the backward DPA channel estimation to calculate a final backward channel estimation value $\hat{H}_i^{backward}(k)$.

15. The V2X communication channel estimation device of claim 14, wherein the calculating of the initial channel estimation value comprises:

receiving two frequency domain training signals $Y_{LTS1}(k)$ and $Y_{LTS2}(k)$ at a k-th subcarrier in the preamble end of the packet; and estimating an initial channel $\hat{H}_i(k)$ based on Equation 1 below by using the two frequency domain training signals $Y_{LTS1}(k)$ and $Y_{LTS2}(k)$ at the k-th subcarrier and a predefined transmission signal $X_0(k)$ at the k-th subcarrier in the preamble end of the packet, $$\hat{H}_0(k) = \frac{Y_{LTS1}(k) + Y_{LTS2}(k)}{2X_0(k)}, k \in \mathbb{S}_D \cup \mathbb{S}_P, \quad \text{[Equation 1]}$$

wherein k is an arbitrary integer subcarrier index, $\mathbb{S}_D$ is a data subcarrier index set, and $\mathbb{S}_P$ is a pilot subcarrier index set.

16. The V2X communication channel estimation device of claim 15, wherein the estimating of the channel based on the reception signal and the transmission signal in the first midamble comprises estimating a channel $\hat{H}_i^{(m)}(k)$ in an m-th first midamble (m is an arbitrary natural number, m∈M) based on Equation 2 below by using a reception signal $Y_i^{(m)}(k)$ and a transmission signal $X_i^{(m)}(k)$ at an i-th OFDM symbol into which the m-th first midamble is inserted, $$\hat{H}_i^{(m)}(k) = \frac{Y_i^{(m)}(k)}{X_i^{(m)}(k)}, k \in \mathbb{S}_D \cup \mathbb{S}_P, \quad \text{[Equation 2]}$$

wherein i is an arbitrary natural number and is an OFDM symbol index constituting the data field.

17. The V2X communication channel estimation device of claim 16, wherein the performing of DPA channel estimation in the time-axis forward direction comprises estimating a channel $\tilde{H}_i(k)$ at the i-th OFDM symbol in the forward direction, based on Equation 3 below, by using a channel value $\hat{H}_{i-1}^{forward}(k)$ estimated at a previous OFDM symbol, and a reception signal $Y_i(k)$ and a transmission signal $\hat{X}_i(k)$ at the i-th OFDM symbol, wherein when the previous OFDM symbol is the first midamble, the channel value $\hat{H}_{i-1}^{forward}(k)$ estimated at the previous OFDM symbol is the channel value $\hat{H}_i^{(m)}(k)$ in the first midamble, $$\tilde{H}_i(k) = \frac{Y_i(k)}{Q\left(\frac{Y_i(k)}{\hat{H}_{i-1}^{forward}(k)}\right)}, \text{ for } k \in \mathbb{S}_D, \quad \text{[Equation 3]}$$

and
  wherein the estimating of the channel $\tilde{H}_i(k)$ at the i-th OFDM symbol in the forward direction comprises:
  equalizing the reception signal $Y_i(k)$ at the i-th OFDM symbol by using the channel value $\hat{H}_{i-1}^{forward}(k)$ estimated at the previous OFDM symbol;
  estimating, based on the equalization result $\hat{T}_i(k)=Y_i(k)/\hat{H}_{i-1}^{forward}(k)$, the transmission signal $\hat{X}_i(k)=Q(\hat{T}_i(k))$ at the i-th OFDM symbol through a symbol demapping process;
  estimating the channel $\tilde{H}_i(k)$ at the i-th OFDM symbol by equalizing the reception signal $Y_i(k)$ through the estimated transmission signal $\hat{X}_i(k)$; and
  repeating the process in the time-axis forward direction from the m-th first midamble to an OFDM symbol before an (m+1)th second midamble.

18. The V2X communication channel estimation device of claim 15, wherein the estimating of the channel based on the reception signal and the transmission signal in the second midamble comprises estimating a channel $\hat{H}_i^{(m)}(k)$ in the (m+1)th second midamble, based on Equation 4 below, by using a reception signal $Y_i^{(m)}(k)$ and a transmission signal $X_i^{(m)}(k)$ at an i-th OFDM symbol into which the (m+1)th second midamble is inserted, $$\hat{H}_i^{(m+1)}(k) = \frac{Y_i^{(m+1)}(k)}{X_i^{(m+1)}(k)}, k \in \mathbb{S}_D \cup \mathbb{S}_P. \quad \text{[Equation 4]}$$

19. The V2X communication channel estimation device of claim 18, wherein the performing of DPA channel estimation in the time-axis backward direction comprises estimating the channel $\tilde{H}_i(k)$ at the i-th OFDM symbol in the backward direction, based on Equation 5 below, by using a channel value $\hat{H}_{i+1}^{backward}(k)$ estimated at a next OFDM symbol, and a reception signal $Y_i(k)$ and a transmission signal $\hat{X}_i(k)$ at the i-th OFDM symbol, $$\tilde{H}_i(k) = \frac{Y_i(k)}{Q\left(\frac{Y_i(k)}{\hat{H}_{i+1}^{backward}(k)}\right)}, \text{ for } k \in \mathbb{S}_D, \quad \text{[Equation 5]}$$

wherein when the next OFDM symbol is the second midamble, the channel value $\hat{H}_{i+1}^{backward}(k)$ estimated at the next OFDM symbol is a channel value $\tilde{H}_i^{(m+1)}(k)$ in the second midamble, and
  wherein the estimating of the channel $\tilde{H}_i(k)$ at the i-th OFDM symbol in the backward direction comprises:
  equalizing the reception signal $Y_i(k)$ at the i-th OFDM symbol by using the channel value $\hat{H}_{i+1}^{backward}(k)$ estimated at the next OFDM symbol;
  estimating, based on the equalization result $\hat{T}_i(k)=Y_i(k)/\hat{H}_{i+1}^{backward}(k)$, the transmission signal $\hat{X}_i(k)=Q(\hat{T}_i(k))$ at the i-th OFDM symbol through a symbol demapping process,
  estimating the channel $\tilde{H}_i(k)$ at the i-th OFDM symbol by equalizing the reception signal $Y_i(k)$ through the estimated transmission signal $\hat{X}_i(k)$; and
  repeating the process in the time-axis backward direction from the (m+1)th second midamble to an OFDM symbol before the m-th first midamble.

20. The V2X communication channel estimation device of claim 14, wherein the estimating of the final channel value of the specific OFDM symbol comprises estimating a channel value $\hat{H}_i(k)$ of a k-th subcarrier of the i-th OFDM symbol by averaging the final forward channel estimation value $\hat{H}_i^{forward}(k)$ and the final backward channel estimation value $\hat{H}_i^{backward}(k)$.

* * * * *